(12) United States Patent
Ko et al.

(10) Patent No.: US 8,565,484 B2
(45) Date of Patent: Oct. 22, 2013

(54) FOREST FIRE SMOKE DETECTION METHOD USING RANDOM FOREST CLASSIFICATION

(75) Inventors: ByoungChul Ko, Daegu (KR); JaeYeal Nam, Daegu (KR); Joon Young Kwak, Daegu (KR)

(73) Assignee: Industry Academic Cooperation Foundation Keimyung University, Daegu (JP)

( * ) Notice: Subject to any disclaimer, the term of this patent is extended or adjusted under 35 U.S.C. 154(b) by 121 days.

(21) Appl. No.: 13/368,553

(22) Filed: Feb. 8, 2012

(65) Prior Publication Data

US 2013/0094699 A1    Apr. 18, 2013

(30) Foreign Application Priority Data

Oct. 12, 2011    (KR) ........................ 10-2011-0104137

(51) Int. Cl.
*G06K 9/00*    (2006.01)
*H04N 5/225*    (2006.01)

(52) U.S. Cl.
USPC ......................................... 382/103; 348/169

(58) Field of Classification Search
USPC .......... 382/103, 236; 348/143, 159, 169, 170, 348/171, 172, 352; 169/43, 45, 46, 47
See application file for complete search history.

(56) References Cited

U.S. PATENT DOCUMENTS 5,049,756 A * 9/1991 Brown de Colstoun et al. .............................. 250/554
8,368,757 B2 * 2/2013 Graser et al. .................. 348/159

* cited by examiner

*Primary Examiner* — Abolfazl Tabatabai
(74) *Attorney, Agent, or Firm* — Jefferson IP Law, LLP

(57) ABSTRACT

A forest fire smoke detection method using random forest classification is provided. In the method, a first reference value is set. For consecutively captured frames, images between the frames are compared, each block, in which a number of pixels, motions of which have been identified, is equal to or greater than the first reference value, is set as a candidate block, and a keyframe is selected. The selected keyframe is compared with at least one frame previous to the keyframe and then a plurality of feature vectors are extracted from the candidate blocks. The extracted feature vectors are learned using different random forest algorithms. Probabilities output to terminal nodes for classes are accumulated, and two first cumulative probability histograms are generated. The two first cumulative probability histograms are averaged, and then a second cumulative probability histogram is generated. A detected state of each candidate block is determined.

12 Claims, 8 Drawing Sheets

FOREST FIRE SMOKE DETECTION METHOD USING RANDOM FOREST CLASSIFICATION

PRIORITY

This application claims the benefit under 35 U.S.C. §119(a) of a Korean patent application filed on Oct. 12, 2011 in the Korean Intellectual Property Office and assigned Serial No. 10-2011-0104137, the entire disclosure of which is hereby incorporated by reference.

BACKGROUND OF THE INVENTION

1. Field of the Invention

The present invention relates to a method of detecting forest fire smoke. More particularly, the present invention relates to a forest fire smoke detection method using random forest classification.

2. Description of the Related Art

Recently, the occurrence of forest fires not only destroys the surrounding environment or the local ecosystem but also potentially puts the living space of human beings in danger. Accordingly, technology for detecting the onset of a forest fire early on has been developed in preparation for the occurrence of a forest fire. In particular, as large-scale forest fires frequently break out all around the world, the necessity for an automatic alarm system has increased that can detect a forest fire in its early stage and that can provide an alarm for the occurrence of the forest fire.

Typically, forest fire detection systems have been configured based on a method in which a watchtower has been built to survey an area where there is the possibility of a forest fire breaking out and a fire watcher working on the watchtower visually determines with the naked eye whether a forest fire has broken out. However, since such a visual detection method requires enormous manpower resources for watching, there have been proposed a variety of technologies for replacing the visual detection method. These technologies may include, for example, a method of installing an infrared sensor that detects the thermal energy of flames, a method of installing Light Detection And Ranging (LIDAR) equipment that measures the intensity of laser light back-scattered by smoke particles, a method of installing a thermal imaging sensor that measures the temperature of flames, etc. However, such optical equipment is problematic in that it is expensive and frequently causes errors due to atmospheric phenomena, such as clouds, fog, or yellow sand, and light scattering, and in that it is difficult for the optical equipment to operate normally when the distance from the sensor to an ignition point increases.

Therefore, recently, as shown in FIG. 1, a method has attracted attention in which video camera equipment, which includes a Charge Coupled Device (CCD) and which is inexpensive and enables remote detection, is installed at the top of the watchtower to detect forest fires. Forest fire detection using CCD video camera equipment is classified into a method of detecting flames and a method of detecting smoke. In the early stage of a forest fire breaking out, the size of the flames is much smaller than the distance from the camera to the ignition point, and thus it is very difficult to detect such flames. In contrast, smoke is characterized in that it is generated earlier than flames and is diffused to a much wider area than are flames. Accordingly, a forest fire detection technology based on smoke detection has been mainly developed.

However, unlike flames, smoke diffuses slowly and the shape and color thereof are vague in general, thus making it difficult to definitely identify smoke. Smoke detection technologies that have been proposed to date can improve the precision of smoke detection when Fuzzy Finite Automata (FFA) and the temporal variation characteristics of images are used. However, since the dimension of a transition matrix used in the related computation increases in proportion to the improvement in precision, there is a concomitant increase in the required memory and computation time. Further, even if a Hidden Markov Model (HMM) is used, there are limitations in that boundary values must be individually and heuristically set so as to determine the states in which images are detected at specific times.

Therefore, a need exists for a system and method for performing a self diagnosis of a device without the inconvenience caused when manually selecting a self diagnosis item from a computer or a user interface.

SUMMARY OF THE INVENTION

Aspects of the present invention are to address at least the above-mentioned problems and/or disadvantages and to provide at least the advantages described below. Accordingly, an aspect of the present invention is to provide a forest fire smoke detection method using random forest classification, which sets a keyframe for video images, selects a candidate block that can be temporarily detected as smoke from among blocks included in the keyframe, classifies temporal and spatial variation characteristics extracted from the candidate block on the basis of two different random forest classification techniques, and finally verifies whether the candidate block is a block indicative of smoke based on the probability distribution of classes generated by the classification, thus improving the precision of smoke detection and reducing the time required for smoke detection.

Another aspect of the present invention is to provide a forest fire smoke detection method using random forest classification, which classifies feature vectors that have incorporated the temporal variation characteristics of a candidate block, and feature vectors that have incorporated the spatial variation characteristics of the candidate block, on the basis of two independent random forest algorithms, thus reducing the erroneous detection caused by clouds or fog.

In accordance with an aspect of the present invention, a forest fire smoke detection method using random forest classification, the method detecting forest fire smoke from frames consecutively captured by video imaging equipment, is provided. The method includes (a) setting a first reference value that is a reference required to classify candidate blocks, (b) with respect to a plurality of consecutively captured frames, comparing images between the frames, setting each block, in which a number of pixels, motions of which have been identified, is equal to or greater than the first reference value, as a candidate block, and selecting a keyframe from among frames that each include one or more candidate blocks, (c) comparing the selected keyframe with at least one frame previous to the keyframe and then extracting a plurality of feature vectors from the candidate blocks, (d) causing the extracted feature vectors to be learned using different random forest algorithms, (e) accumulating probabilities output to terminal nodes for classes generated as a result of the learning, and then generating two first cumulative probability histograms, each having a size identical to a number of the classes, (f) averaging the two first cumulative probability histograms for the individual classes, and then generating a second cumulative probability histogram, and (g) determining a detected state of each candidate block depending on a class having a highest probability among the classes constituting the generated second cumulative probability histogram.

Preferably, (a) may be configured to further set a second reference value that is a reference required to select the keyframe, and (b) may be configured such that the keyframe is selected from among frames, each including a number of candidate blocks that are equal to or greater than the second reference value.

Preferably, in (b), the comparison of the images between the frames may be conducted by performing a morphology operation on a difference image between a reference frame included in the plurality of frames and a frame subsequent to the reference frame.

Preferably, in (c), temporal feature vectors incorporating temporal variation characteristics and spatial feature vectors incorporating spatial variation characteristics may be individually extracted from each candidate block.

Preferably, in (c), any one of the extracted feature vectors may include a component corresponding to at least one selected from among hue average, hue skewness, saturation average, saturation skewness, intensity average, intensity skewness, wavelet energy average, wavelet energy skewness and motion orientation, which are extracted from each candidate block by comparing the keyframe with the at least one frame previous to the keyframe.

Preferably, the motion orientation may be a direction value set according to a difference between images of the keyframe and a frame just previous to the keyframe.

Preferably, the direction value may be set as a value matched with a direction corresponding to a movement direction of each candidate block when different values for identifying two or more directions are matched with the respective directions.

Preferably, in (c), any one of the extracted feature vectors may include a component that is a Histogram of Oriented Gradients (HOG) extracted from each candidate block for the keyframe.

Preferably, in (d), the learning may be performed using a random forest algorithm for classing the feature vectors into four classes.

Preferably, the four classes may be set to a Very High (VH) class, a High (H) class, a Low (L) class, and a Very Low (VL) class depending on a probability of the candidate block being detected as a smoke block.

Preferably, (g) may be configured such that if the class having the highest probability among the classes constituting the second cumulative probability histogram is the VH class or the H class, the candidate block is determined to be a smoke block indicative of a forest fire; and if the class having the highest probability among the classes constituting the second cumulative probability histogram is the VL class or the L class, the candidate block is determined to be a non-smoke block.

Preferably, the forest fire smoke detection method may further include (h) making a distinguishing indication on the determined smoke block so that the smoke block can be distinguished from non-smoke blocks.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the entire specification, a representation indicating that a first part is "connected" to a second part includes the case where the first part is "indirectly connected" to the second part with some other element interposed therebetween, as well as the case where the first part is "directly connected" to the second part. Further, a representation indicating that a certain part "includes" a certain element means that more elements may be further included in the certain part without excluding other elements unless a description to the contrary is specifically pointed out.

Figure 1:
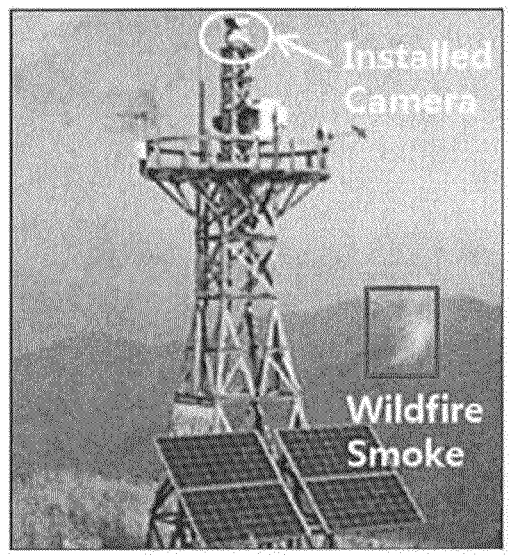
FIG. 1 is a diagram showing a state in which a CCD video camera for providing video images, to which a forest fire smoke detection method using random forest classification according to an exemplary embodiment of the present invention is applied, is installed at the top of a watchtower.
Figure 2A:
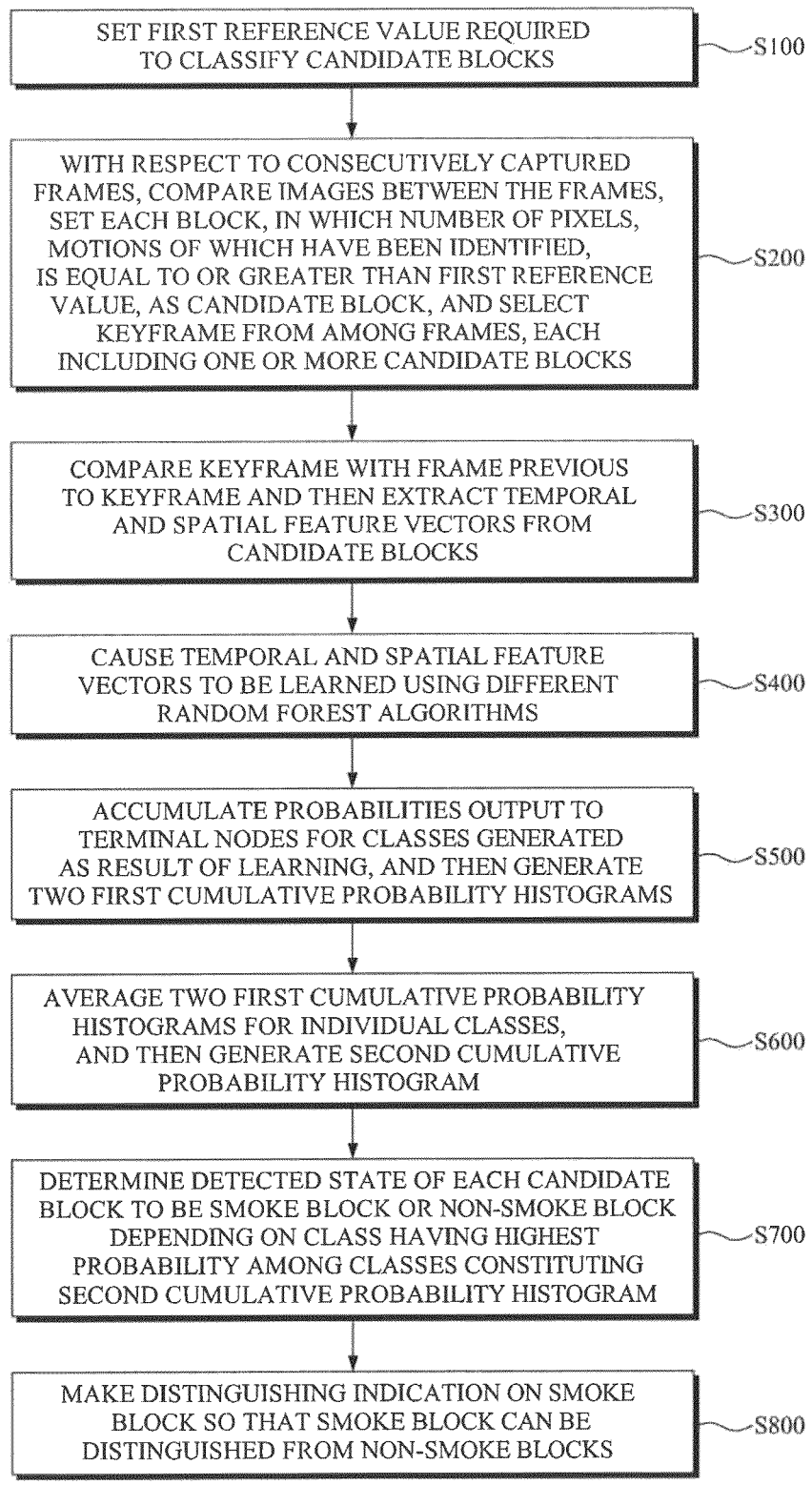
FIG. 2A is a flowchart showing a forest fire smoke detection method using random forest classification according to an exemplary embodiment of the present invention.
Figure 2B:
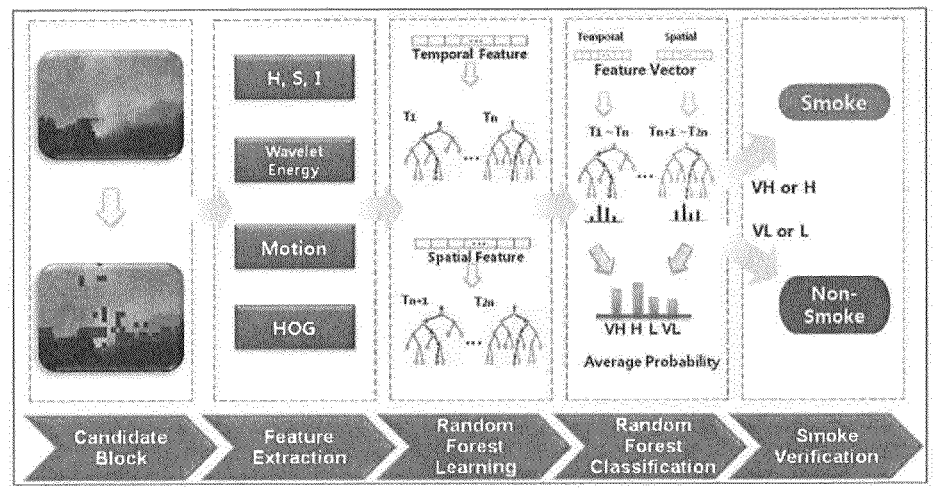
FIG. 2B is a diagram illustrating the flow of the forest fire smoke detection method using random forest classification according to an exemplary embodiment of present invention.

FIG. 2A is a flowchart showing a forest fire smoke detection method using random forest classification according to an exemplary embodiment of the present invention, and FIG. 2B is a diagram illustrating the flow of the forest fire smoke detection method using random forest classification according to an exemplary embodiment of the present invention.

As shown in FIG. 2A, the forest fire smoke detection method using random forest classification according to an embodiment of the present invention may be implemented to include steps S100 to S800. In step S100, a first reference value required to classify candidate blocks is set. In step S200, with respect to a plurality of consecutively captured frames, images between the frames are compared, so that each block in which the number of pixels, the motions of which have been identified, is equal to or greater than the first reference value is set as a candidate block, and a keyframe is selected from among the frames, each including one or more candidate blocks. In step S300, the keyframe is compared with a frame previous to the keyframe, and then temporal feature vectors and spatial feature vectors are extracted from the candidate blocks. In step S400, the temporal feature vectors and the spatial feature vectors are learned using different random forest algorithms. In step S500, with respect to classes generated as a result of the learning, probabilities output to terminal nodes are accumulated, so that two first cumulative probability histograms are generated. In step S600, the two first cumulative probability histograms are averaged for individual classes, and then a second cumulative probability histogram is generated. In step S700, the detected state of each candidate block is determined to be a smoke block or a non-smoke block depending on the class having the highest probability, among the classes constituting the second cumulative probability histogram. The method may further include the step S800 of making distinguishing indication on the smoke block so that the smoke block can be distinguished from non-smoke blocks.

That is, the present invention respectively classifies temporal and spatial variation characteristics extracted from the candidate blocks using different random forest classification techniques, and finally verifies whether each candidate block is a block indicative of smoke on the basis of the probability distribution of the classes, thus improving the precision of smoke detection, and reducing the time required for smoke detection and erroneous detection caused by clouds or fog.

Meanwhile, video imaging equipment that sets candidate blocks from consecutively captured frames, extracts temporal and spatial feature vectors from the candidate blocks, and classifies the feature vectors using random forest algorithms according to the present invention is video imaging equipment provided with a memory unit and a Central Processing Unit (CPU). Here, the memory unit stores frame images captured by a Charge Coupled Device (CCD) video camera, and the CPU may be a processor capable of performing various operations on image data included in pixels constituting each frame or in sets (blocks) of the pixels. Hereinafter, the individual steps of the forest fire smoke detection method using random forest classification according to the embodiment of the present invention will be described in detail.

In step S100, the first reference value required to classify candidate blocks may be set. The first reference value is a positive integer and may be set within a range that does not exceed the number of pixels included in each block when each frame is divided into m×n blocks. Meanwhile, in step S100, a second reference value required to select the keyframe may be further set. In this case, the second reference value is also a positive integer and may be set within a range that does not exceed the number of blocks into which each frame is divided.

In step S200, with respect to the plurality of consecutively captured frames, the images between the frames are compared with each other. Each block in which the number of pixels, the motions of which have been identified, is equal to or greater than the first reference value is set as a candidate block. A keyframe may be selected from among frames, each including one or more candidate blocks. The term "candidate block" refers to a block, in which a number of pixels that are equal to or greater than the first reference value are determined to be moved within a predetermined block. When the motion of each pixel is identified due to the diffusion of smoke, the movement of leaves, the motion of birds, etc., a block including a large number of such pixels may be set as a candidate block that may be temporarily detected as smoke. Further, the term "keyframe" refers to a frame that is a reference for extracting feature vectors, which will be described in detail in step S300, and may be a frame including one or more candidate blocks. Meanwhile, when the second reference value is further set in step S100, a frame including a number of candidate blocks that are equal to or greater than the second reference value may be selected as the keyframe. That is, a block in which the motions of a large number of pixels are identified may be set as a candidate block, and a frame which includes a large number of candidate blocks may be selected as the keyframe.

Meanwhile, the comparison of the images between frames performed in step S200 may be conducted by performing a morphology operation on a difference image between a reference frame and a frame subsequent to the reference frame. That is, on the basis of a specific time, the keyframe, present before the specific time, is set as a reference frame, and a difference image between a relevant frame and the reference frame is obtained. Then, a small motion, such as the motion of a tree, is eliminated by applying a morphology operation to the difference image. Thereafter, the number of pixels, the motions of which have been identified, is counted, thus enabling the candidate block to be set. The reason for performing the morphology operation in this way is that the diffusion speed of a smoke area varies with the wind strength or the distance from the camera to an ignition point, thus making it very difficult to detect the area of motion in all frames.

Figure 3A:
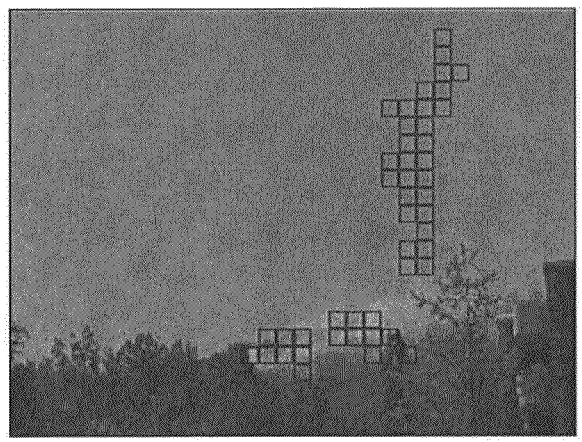
FIG. 3A is a diagram showing a keyframe, including candidate blocks in a smoke area and selected in the step S200 of the forest fire smoke detection method using random forest classification according to an exemplary embodiment of the present invention.
Figure 3B:
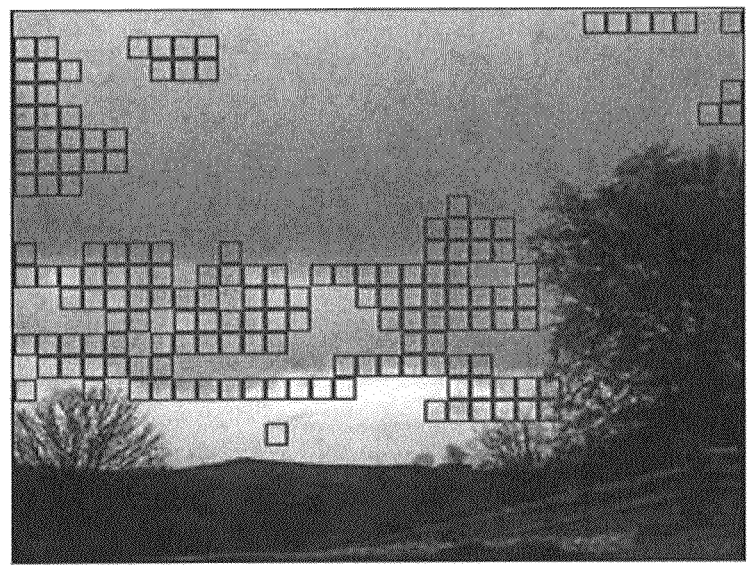
FIG. 3B is a diagram showing a keyframe, including candidate blocks in a cloud area and selected in the step S200 of the forest fire smoke detection method using random forest classification according to another exemplary embodiment of the present invention.

FIGS. 3A and 3B respectively illustrate a keyframe including candidate blocks in a smoke area and a keyframe including candidate blocks in a cloud area, wherein the keyframes are selected in the step S200 of the forest fire smoke detection method using random forest classification according to an exemplary embodiment of the present invention.

As shown in FIGS. 3A and 3B, as smoke diffuses or as clouds move, when the number of pixels, the motions of which have been identified, is equal to or greater than the first reference value, in each frame, relevant blocks in the frame are set as candidate blocks (indicated by squares in each drawing). A frame including a number of candidate blocks that are equal to or greater than the second reference value may be selected as a keyframe.

In step S300, the keyframe and a frame previous to the keyframe are compared with each other, and thus temporal feature vectors and spatial feature vectors may be extracted from the candidate blocks. Each feature vector is a vector having, as components, hue average, hue skewness, saturation average, saturation skewness, intensity average, intensity skewness, wavelet energy average, wavelet energy skewness, motion orientation, Histogram of Oriented Gradients (HOG), or the like. These components may be obtained from the keyframe itself or from the comparison between the keyframe and its previous frames. For example, if the temporal variation characteristics of a smoke area are represented using feature vectors, vectors having values obtained by averaging the hue, saturation or intensity of a Hue, Saturation, Intensity (HSI) model as components or having skewness based on the distribution of hue, saturation or intensity as components may be extracted from blocks arranged at locations corresponding to that of the candidate block in the keyframe and 100 frames previous to the keyframe. In this case, the reason for using saturation or intensity is that a smoke area appearing in each frame generally has the characteristics of low saturation and high intensity.

Meanwhile, when the frequency characteristics of a smoke area over time are represented using feature vectors, vectors having wavelet energy average or wavelet energy skewness as components may be extracted from blocks arranged at locations corresponding to that of the candidate block in the keyframe and 100 frames previous to the keyframe. In this case, wavelet energy may be obtained by performing a Daubechies wavelet transform and then performing linear coupling between high-frequency coefficients appearing on the candidate block.

Further, when the orientation of the motion of the smoke area over time is represented using feature vectors, vectors may be extracted that have as their components direction values, which are set according to a difference between images of the keyframe and a frame just previous to the keyframe. In this case, the direction values are values required to identify individual directions and may be set in such a way that different values used to identify the individual directions are matched with two or more directions and that a vector has a value, matched with the movement direction of the candidate block, as a direction value. That is, feature vectors can be extracted so that the movement direction of smoke can be detected from values matched with the candidate block.

Figure 4:
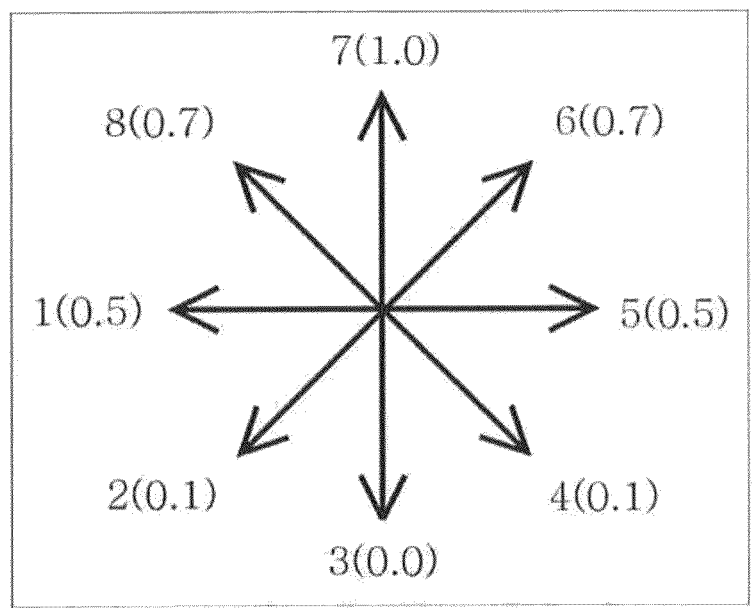
FIG. 4 is a diagram showing direction values set for motion orientation corresponding to the components of feature vectors extracted in the step S300 of the forest fire smoke detection method using random forest classification according to an exemplary embodiment of the present invention.

FIG. 4 is a diagram showing direction values set for motion orientation corresponding to the components of feature vectors extracted in the step S300 of the forest fire smoke detection method using random forest classification according to an exemplary embodiment of the present invention.

As shown in FIG. 4, the orientation of motions may be divided into eight directions, and direction values 1 to 8 may be matched with the respective directions.

Meanwhile, when the spatial variation characteristics of a smoke area are represented using feature vectors, vectors having a Histogram of Oriented Gradients (HOG) for the candidate block of the keyframe as components may be extracted. HOG is a feature descriptor mainly used in computer image processing, and is configured such that a gradient is calculated using the local intensity difference of the image included in the frame, thus enabling spatial variation characteristics to be desirably incorporated in spite of a variation in background light.

Figure 5:
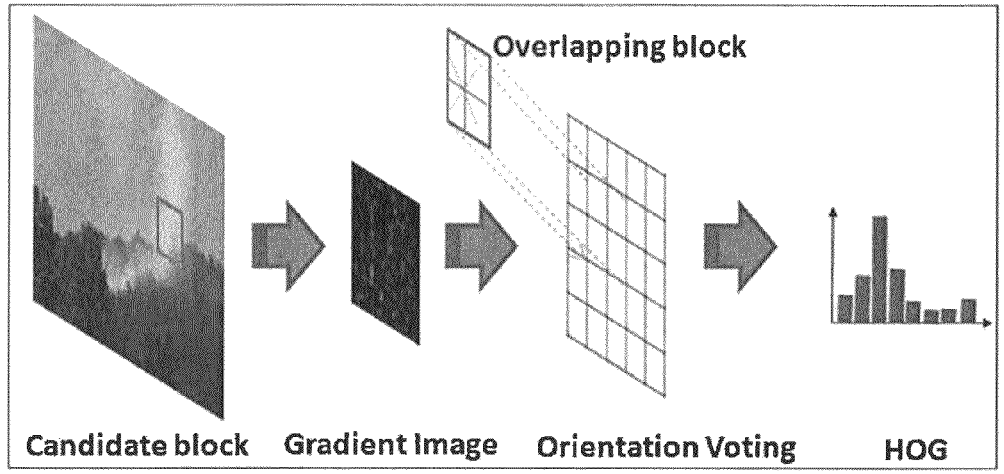
FIG. 5 is a diagram showing a procedure for extracting a Histogram of Oriented Gradients (HOG) corresponding to the components of feature vectors from a candidate block in the step S300 of the forest fire smoke detection method using random forest classification according to an exemplary embodiment of the present invention.

FIG. 5 illustrates a procedure for extracting an HOG corresponding to the components of feature vectors from a candidate block in the step S300 of the forest fire smoke detection method using random forest classification according to an exemplary embodiment of the present invention.

As shown in FIG. 5, the HOG may be extracted by calculating a gradient image from the candidate block and obtaining a histogram depending on the orientation of the gradient image.

Meanwhile, the reason for separately extracting temporal feature vectors indicating temporal variation characteristics and spatial feature vectors indicating spatial variation characteristics in step S300 is to prevent components having different features from being mixed together and classified when vectors are classified by a random forest classifier, which will be described later, thus enabling a smoke area to be more definitely detected. For example, a temporal feature vector may have, as a component, at least one of hue average, hue skewness, saturation average, saturation skewness, intensity average, intensity skewness, wavelet energy average, and wavelet energy skewness, and a spatial feature vector may have an HOG as a component.

In step S400, the temporal feature vectors and the spatial feature vectors may be learned by different random forest algorithms. A random forest is a classifier based on binary decision trees, and learning based on random forest algorithms is implemented as a procedure for classifying individual feature vectors into two or more classes. The reason for classifying feature vectors using random forests is that random forest classification has the advantages of having high precision and being outstanding in the execution of a large amount of data at high learning speed. Depending on embodiments, the feature vectors may be classified into four classes, that is, Very High (VH), High (H), Low (L), and Very Low (VL) classes, in step S400 on the basis of the probability that each candidate block from which the feature vectors were extracted may be detected as a smoke block.

In step S500, for the classes generated as a result of the learning in step S400, the probabilities output to the terminal nodes are accumulated, and then two first cumulative probability histograms may be generated that indicate the results of learning the temporal feature vectors and the results of learning the spatial feature vectors. The terminal nodes of classes classified in step S400 denote the number of cases that the components of the feature vectors may have. Accordingly, each probability may be obtained from the number of nodes of each class to the total number of terminal nodes. When the probabilities obtained at this time are accumulated, the first cumulative probability histograms having the accumulated probabilities for the respective classes may be generated.

In step S600, the two first cumulative probability histograms generated in step S500 are averaged for individual classes, and then a second cumulative probability histogram may be generated. For example, when both the temporal feature vectors and the spatial feature vectors are classified into VH, H, L, and VL classes in step S400, cumulative probabilities for individual VH, H, L, and VL classes in the two first cumulative probability histograms generated in step S500 are averaged, and then the second cumulative probability histogram may be generated. In this way, the method of causing feature vectors having different characteristics (that is, having temporal and spatial variation characteristics) to be primarily learned by the random forest classifier, averaging the results of learning, and incorporating the two characteristics into a single histogram can improve the precision of detection of the smoke area, compared to the results obtained by combining feature vectors having different features into a single vector, and causing the single vector to be learned by the random forest classifier. This will be described in detail later with reference to FIG. 7.

Figure 6:
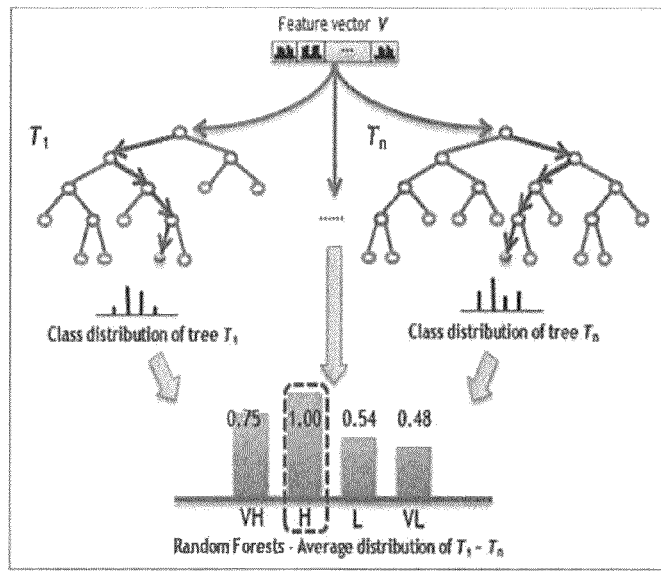
FIG. 6 is a diagram showing a procedure for averaging two first cumulative probability histograms for individual classes and then generating a second cumulative probability histogram in the step S600 of the forest fire smoke detection method using random forest classification according to an exemplary embodiment of the present invention.

FIG. 6 illustrates a procedure for averaging two first cumulative probability histograms for individual classes and then generating a second cumulative probability histogram in the step S600 of the forest fire smoke detection method using random forest classification according to an exemplary embodiment of the present invention.

As shown in FIG. 6, temporal feature vectors and spatial feature vectors extracted from the candidate blocks of each keyframe may be classified into four classes based on random forests to obtain two first cumulative probability histograms, and the first cumulative probability histograms obtained in this way may be averaged to generate a single second cumulative probability histogram.

In step S700, the detected state of each candidate block may be determined to be a smoke block or a non-smoke block depending on a class having the highest probability among the classes constituting the second cumulative probability histogram. For example, in the case where the second cumulative probability histogram is generated in step S600 depending on the results of classifying the temporal feature vectors and the spatial feature vectors into VH, H, L, and VL classes using different random forest algorithms in step S400, if a class having the highest probability is a VH or H class, the candidate block may be determined to be a smoke block. In contrast, if a class having the highest probability in the second cumulative probability histogram is a VL or L class, the candidate block may be determined to be a non-smoke block. In FIG. 6, it can be verified that the temporal/spatial characteristics of the feature vectors extracted from the candidate block are classified as the H class, and then the candidate block has been detected as a smoke block.

Meanwhile, in step S800, a distinguishing indication may be made on the smoke block so that the smoke block can be distinguished from non-smoke blocks. That is, when a certain candidate block is detected as a smoke block, the smoke block itself or the edge of the smoke block is indicated in a color separate from that of an image of the frame so as to indicate that a forest fire has broken out, thus enabling smoke blocks to be distinguished from non-smoke blocks.

Figure 7:
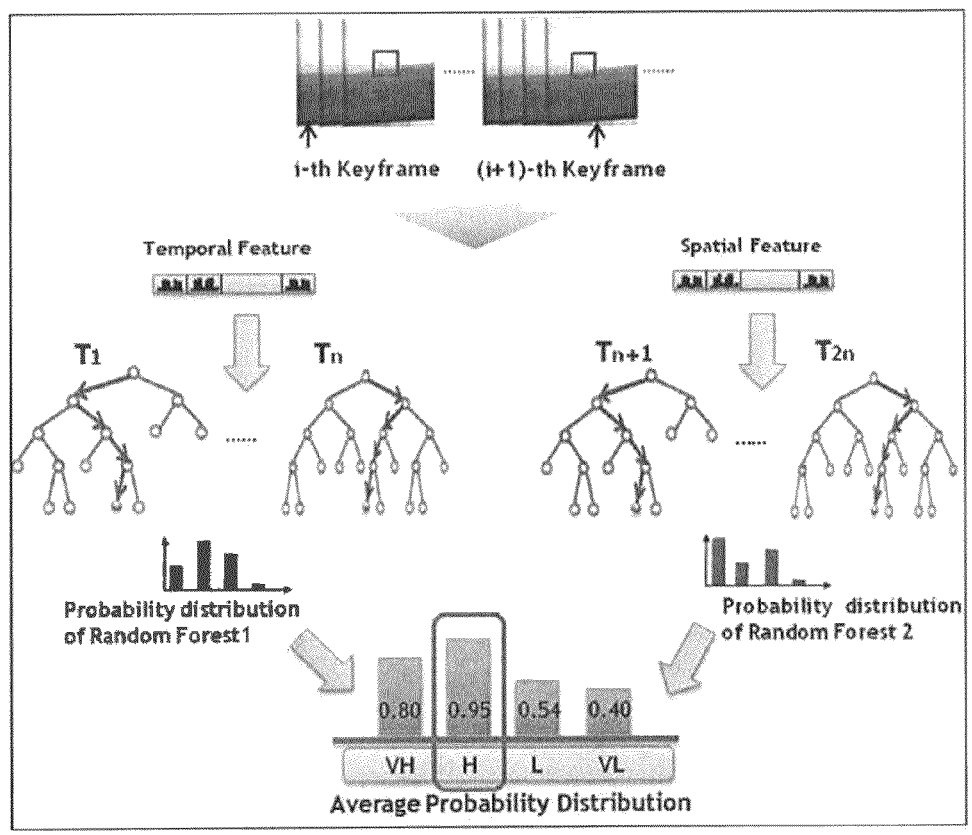
FIG. 7 is a diagram showing the precision of smoke detection based on feature vectors classified by the forest fire smoke detection method using random forest classification according to an embodiment of the present invention and based on feature vectors classified by a conventional forest fire smoke detection method using Multi-class Support Vector Machine (MSVM) classification according to an exemplary embodiment of the present invention.

FIG. 7 is a diagram showing the precision of smoke detection based on feature vectors classified by the forest fire smoke detection method using random forest classification according to an embodiment of the present invention and based on feature vectors classified by a conventional forest fire smoke detection method using Multi-class Support Vector Machine (MSVM) classification according to an exemplary embodiment of the present invention.

Referring to FIG. 7, with respect to the three cases, that is, the case where a smoke area is detected as a smoke block (Average True Positive Rate: ATPR), the case where a non-smoke area is erroneously detected as a smoke block (Average False Positive Rate: AFPR), and the case where a smoke area is missed without being detected as a smoke block (Average Missing Rate: AMR), the precision of smoke detection is classified. In FIG. 7, with respect to various cases, that is, the case where temporal feature vectors and spatial feature vectors are respectively classified using two different random forest algorithms and averaged (T_RF+S_RF), the case where temporal and spatial variation characteristics are represented using a single feature vector and the feature vector is classified using random forest (T+S_RF), the case where only feature vectors indicating temporal variation characteristics are classified using random forest (T_RF), the case where only feature vectors indicating spatial variation characteristics are classified using random forest (S_RF), and the case where temporal and spatial variation characteristics are represented using a single feature vector and the feature vector is classified based on MSVM (T+S_MSVM), the precision of smoke detection is shown. As shown in FIG. 7, when the temporal feature vectors and the spatial feature vectors are respectively classified using different random forest algorithms and the results generated from the classification are averaged (T_RF+S_RF), the precision of smoke detection can be improved compared to the four other cases.

Figure 8:
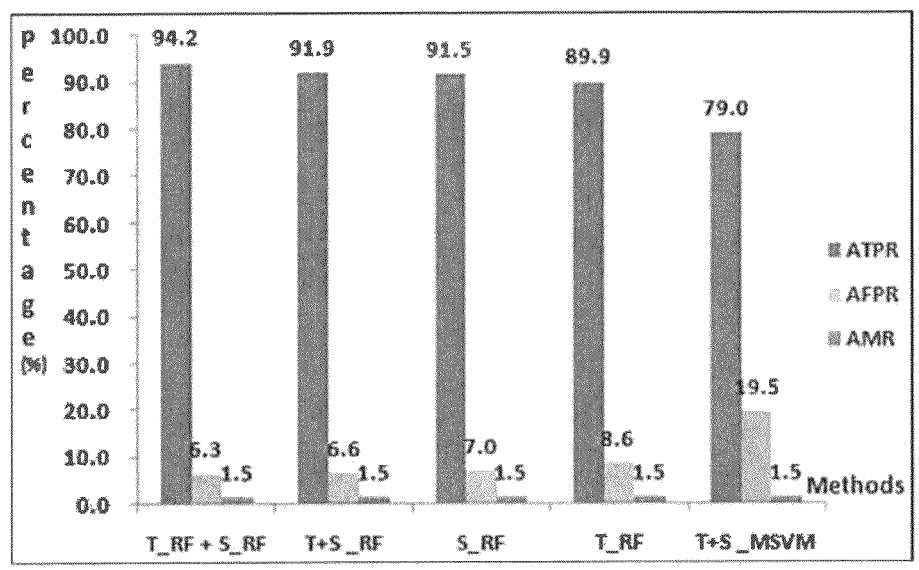
FIG. 8 is a diagram showing the precision of smoke detection performed by the forest fire smoke detection method using random forest classification according to an embodiment of the present invention, by a conventional smoke detection method using Fuzzy Finite Automata (FFA), and by a conventional smoke detection method using a Hidden Markov Model (HMM) according to an exemplary embodiment of the present invention.

FIG. 8 is a diagram showing the precision of smoke detection performed by the forest fire smoke detection method using random forest classification according to an exemplary embodiment of the present invention, by a conventional smoke detection method using FFA, and by a conventional smoke detection method using an HMM. As shown in FIG. 8, the forest fire smoke detection method using random forest classification according to the embodiment of the present invention can improve precision (ATPR) in which a smoke area is detected as a smoke block and can reduce the occurrence of errors by which a non-smoke area is erroneously detected as a smoke block (AFPR) or by which a smoke area is missed (AMR), compared to the conventional smoke detection methods based on FFA and based on HMM.

Figure 9:
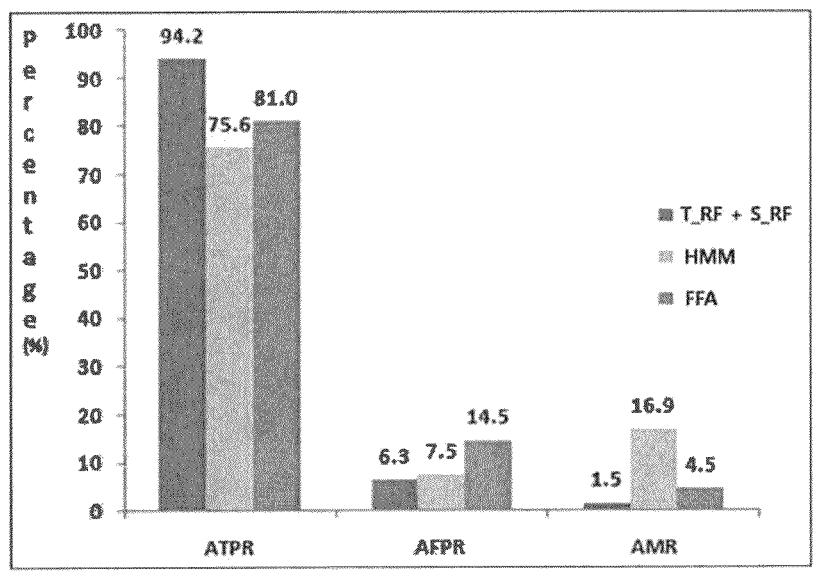
FIG. 9 is a diagram showing video images to which the forest fire smoke detection method using random forest classification according to an exemplary embodiment of the present invention has been applied.

FIG. 9 is a diagram showing video images (Movies 1 to 6) to which the forest fire smoke detection method using random forest classification according to an exemplary embodiment of the present invention has been applied. As shown in FIG. 9, when the forest fire smoke detection method using random forest classification according to the embodiment of the present invention is applied, smoke areas (Movies 1 to 5) may be precisely detected so that they can be distinguished from non-smoke areas (Movies 6 to 10), such as clouds or fog.

Figure 10:
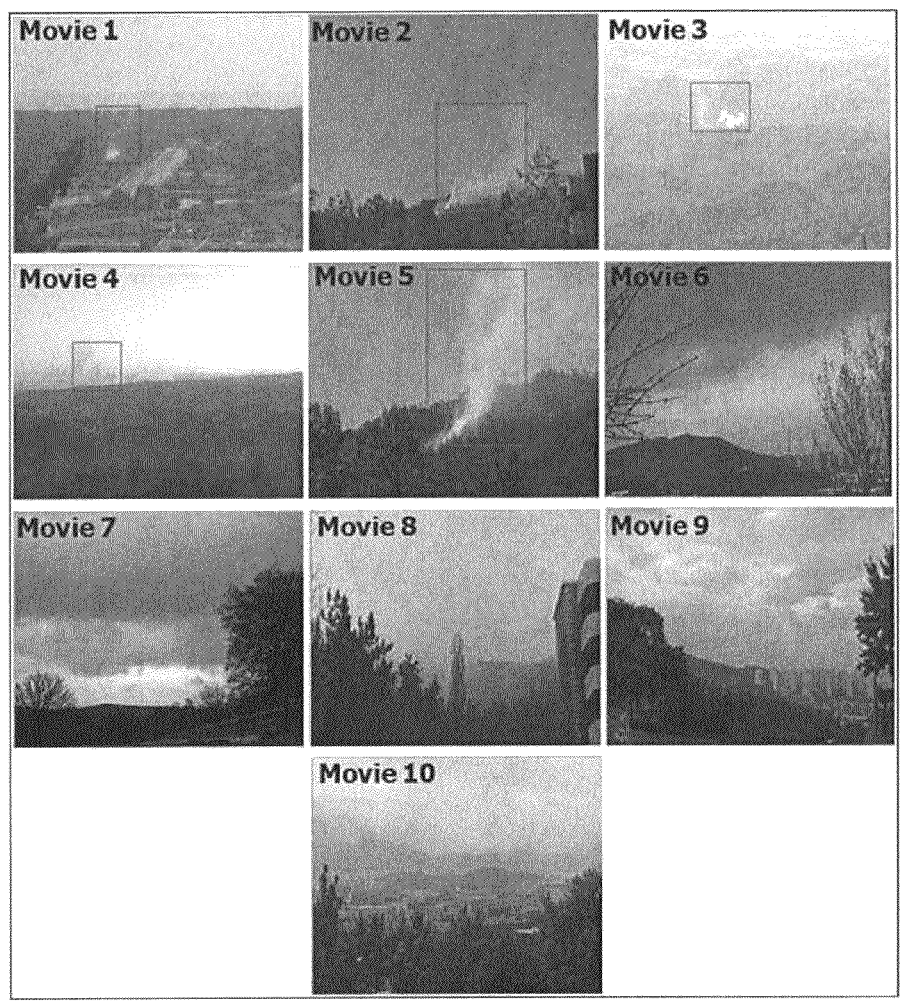
FIG. 10 is a diagram showing a plurality of video images provided by a CCD video camera according to an exemplary embodiment of the present invention.

FIG. 10 is a diagram showing a plurality of video images provided by a CCD video camera according to an exemplary embodiment of the present invention.

As described above, the forest fire smoke detection method using random forest classification proposed in the present invention is advantageous in that it sets a keyframe for video images, selects a candidate block that can be temporarily detected as smoke from among blocks included in the keyframe, classifies temporal and spatial variation characteristics extracted from the candidate block on the basis of two different random forest classification techniques, and finally verifies whether the candidate block is a block indicative of smoke based on the probability distribution of classes generated by the classification, thus improving the precision of smoke detection and reducing the time required for smoke detection.

Further, the present invention is advantageous in that it classifies feature vectors that have incorporated the temporal variation characteristics of a candidate block, and feature vectors that have incorporated the spatial variation characteristics of the candidate block, on the basis of two independent random forest algorithms, thus reducing the erroneous detection caused by clouds or fog.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A forest fire smoke detection method using random forest classification, the method detecting forest fire smoke from frames consecutively captured by video imaging equipment, the forest fire smoke detection method comprising:
    (a) setting a first reference value that is a reference required to classify candidate blocks;
    (b) with respect to a plurality of consecutively captured frames, comparing images between the frames, setting each block, in which a number of pixels, motions of which have been identified, is equal to or greater than the first reference value, as a candidate block, and selecting a keyframe from among frames that each include one or more candidate blocks;
    (c) comparing the selected keyframe with at least one frame previous to the keyframe and then extracting a plurality of feature vectors from the candidate blocks;
    (d) causing the extracted feature vectors to be learned using different random forest algorithms;
    (e) accumulating probabilities output to terminal nodes for classes generated as a result of the learning, and then generating two first cumulative probability histograms, each having a size identical to a number of the classes;
    (f) averaging the two first cumulative probability histograms for the individual classes, and then generating a second cumulative probability histogram; and
    (g) determining a detected state of each candidate block depending on a class having a highest probability among the classes constituting the generated second cumulative probability histogram.

2. The forest fire smoke detection method according to claim 1, wherein:
    step (a) is configured to further set a second reference value that is a reference required to select the keyframe; and
    step (b) is configured such that the keyframe is selected from among frames, each including a number of candidate blocks that are equal to or greater than the second reference value.

3. The forest fire smoke detection method according to claim 1, wherein in step (b), the comparison of the images between the frames is conducted by performing a morphology operation on a difference image between a reference frame included in the plurality of frames and a frame subsequent to the reference frame.

4. The forest fire smoke detection method according to claim 1, wherein in step (c), temporal feature vectors incorporating temporal variation characteristics and spatial feature vectors incorporating spatial variation characteristics are individually extracted from each candidate block.

5. The forest fire smoke detection method according to claim 4, wherein in step (d), the learning is performed using a random forest algorithm for classing the feature vectors into four classes.

6. The forest fire smoke detection method according to claim 5, wherein the four classes are set to a Very High (VH) class, a High (H) class, a Low (L) class, and a Very Low (VL) class depending on a probability of the candidate block being detected as a smoke block.

7. The forest fire smoke detection method according to claim 6, wherein step (g) is configured such that:
    if the class having the highest probability among the classes constituting the second cumulative probability histogram is the VH class or the H class, the candidate block is determined to be a smoke block indicative of a forest fire; and
    if the class having the highest probability among the classes constituting the second cumulative probability histogram is the VL class or the L class, the candidate block is determined to be a non-smoke block.

8. The forest fire smoke detection method according to claim 7, further comprising:
    (h) making a distinguishing indication on the determined smoke block so that the smoke block can be distinguished from non-smoke blocks.

9. The forest fire smoke detection method according to claim 1, wherein in step (c), any one of the extracted feature vectors includes a component corresponding to at least one selected from among hue average, hue skewness, saturation average, saturation skewness, intensity average, intensity skewness, wavelet energy average, wavelet energy skewness and motion orientation, which are extracted from each candidate block by comparing the keyframe with the at least one frame previous to the keyframe.

10. The forest fire smoke detection method according to claim 9, wherein the motion orientation is a direction value set according to a difference between images of the keyframe and a frame just previous to the keyframe.

11. The forest fire smoke detection method according to claim 10, wherein the direction value is set as a value matched with a direction corresponding to a movement direction of each candidate block when different values for identifying two or more directions are matched with the respective directions.

12. The forest fire smoke detection method according to claim 1, wherein in step (c), any one of the extracted feature vectors includes a component that is a Histogram of Oriented Gradients (HOG) extracted from each candidate block for the keyframe.

* * * * *